United States Patent [19]

Mamiya et al.

[11] Patent Number: 4,646,522

[45] Date of Patent: Mar. 3, 1987

[54] KNOCK CONTROL SYSTEM FOR SUPERCHARGED ENGINE

[75] Inventors: Kiyotaka Mamiya, Higashihiroshima; Tadashi Kaneko, Hiroshima; Misao Fujimoto, Higashihiroshima; Hirofumi Nishimura, Hiroshima, all of Japan

[73] Assignee: Mazda Motor Corporation, Hiroshima, Japan

[21] Appl. No.: 750,149

[22] Filed: Jul. 1, 1985

[30] Foreign Application Priority Data

Jul. 4, 1984 [JP] Japan ................................. 59-138136

[51] Int. Cl.$^4$ ........................... F02B 37/00; F02P 5/14
[52] U.S. Cl. ........................................ 60/602; 60/611; 123/425; 123/564
[58] Field of Search ................. 60/600, 601, 602, 603, 60/611; 123/425, 559, 564, 406

[56] References Cited

U.S. PATENT DOCUMENTS 4,387,571 6/1983 Katsumata et al. .
4,463,565 8/1984 Rydquist et al. .
4,477,875 10/1984 Suzuki ................................. 60/603
4,509,331 4/1985 Hirabayashi ....................... 123/425

FOREIGN PATENT DOCUMENTS 3106579 9/1982 Fed. Rep. of Germany ........ 60/602
58-72644 4/1983 Japan .

Primary Examiner—Douglas Hart
Attorney, Agent, or Firm—Burns, Doane, Swecker & Mathis

[57] ABSTRACT

A knock control system for a supercharged engine comprising a supercharger for providing a super charged air to the engine, an engine condition detector for detecting an engine operating condition, a knock detector for detecting the occurrence of engine knocking, an ignition timing determining unit, a supercharged pressure regulator, an ignition timing correcting unit, and a supercharged pressure correcting unit. The timing determining unit is operable to determine a principle ignition timing in response to an output from the condition detector, and the timing correcting unit is operable in response to an output from the knock detector to adjust the principle ignition timing in the event of occurrence of the knocking.

12 Claims, 14 Drawing Figures (A)

(B)

KNOCK CONTROL SYSTEM FOR SUPERCHARGED ENGINE

BACKGROUND OF THE INVENTION

The present invention generally relates to a knock control system for a supercharged internal combustion engine and, more particularly, to the control of both the ignition timing and the supercharged pressure in the event of occurrence of the engine knocking to minimize the reduction in performance of the engine.

U.S. Pat. No. 4,387,571, patented June 14, 1983, discloses the control of the supercharged pressure, being introduced into the engine cylinders, according to the intensity of the knocking occurring in the supercharged engine. The system disclosed therein generally comprises a supercharge control device designed either to allow a portion of exhaust gases to bypass the exhaust-driven turbine of the supercharger or to relieve a portion of supercharged air, being introduced past the supercharger compressor into the engine cylinder, to the atmosphere or back into the intake passage upstream of the compressor, means for detecting the frequency of occurrence of the knocking, and a control circuitry for controlling the supercharge control device in dependence on the frequency of occurrence of the knocking detected. According to this system, it is claimed that the minimization of occurrence of the heavy knocking thereby to avoid the failure of the engine to operate can be achieved by lowering the supercharged pressure in the event of occurrence of the knocking.

The engine knocking can be substantially eliminated, or minimized, not only by the control of the supercharged pressure such as hereinabove discussed, but also by the control of the ignition timing as is well known to those skilled in the art. In the case of the control of the ignition timing, the ignition timing is retarded in response to the occurrence of the engine knocking to achieve the intended purpose.

When it however comes to the simultaneous control of both the supercharged pressure and the ignition timing for the achievement of the intended purpose, Japanese Laid-open Patent Publication No. 58-72644, published Apr. 30, 1983, discloses a knock control system which comprises a knock sensor capable of generating a knock signal indicative of the occurrence of the knocking in the supercharged engine; an engine sensor capable of generating an engine signal indicative of an operating condition of the engine; a supercharge sensor capable of generating a supercharge signal indicative of the pressure of supercharged air flowing in the engine intake piping; a supercharge control means for controlling the supercharged air; an ignition timing control means for controlling the ignition timing; and a controller for generating a control output to both of the supercharge control means and the ignition timing control means in dependence on all of the knock signal, the engine signal and the supercharge signal. The controller used in this knock control system comprises a pressure comparison means for comparing the supercharged pressure detected by the supercharge sensor with a reference supercharge pressure calculated (or determined) in dependence on the intelligence derived from the engine signal; a timing comparison means for comparing the ignition timing detected by the ignition timing detector with a reference ignition timing calculated (or determined) in dependence on the engine operating condition and the supercharged pressure for giving the substantially highest possible engine torque; and a control unit.

The control unit referred to above is described as electrically connected with both of the supercharge control means and the ignition timing control means so that, when intelligence derived from a combination of the output signals from the respective pressure and timing comparison means has indicated that the supercharged pressure detected is equal to the reference supercharged pressure, the ignition timing can be controlled while the supercharged pressure is fixed at a value equal to the reference supercharged pressure, it being, however, that when as a result of the control of the ignition timing so effected the controlled ignition timing deviates from a predetermined range adjacent and retarded a predetermined angle from the reference ignition timing, the supercharged pressure can be controlled in dependence on the knock signal and regardless of the supercharge signal while the ignition timing is fixed at a timing falling within the predetermined range and retarded a predetermined angle relative to the reference ignition timing, but that, when the same intelligence has indicated that the supercharged pressure detected is lower than the reference supercharged pressure, the ignition timing can be controlled.

U.S. Pat. No. 4,463,565, patented Aug. 7, 1984, also discloses a similar knock control system, but it has been found having a problem in that, since as a matter of design the adjustment of the supercharged pressure does not quickly take place, while that of the ignition timing can take place relatively quickly, in response to the occurrence of the knocking, the ignition timing must be greatly retarded in order for the knocking to be quickly suppressed, with the consequence that the system as a whole is susceptible to the admission of heavy knocking particularly when the reduction in engine power output as a result of the adjusted ignition timing and that as a result of the adjusted supercharged pressure take place generally simultaneously. As is well known to those skilled in the art, the control of the supercharged air while the retardation of the ignition timing is minimized is preferred for the prevention of both the reduction in engine power output and the excessive increase of the exhaust temperature.

SUMMARY OF THE INVENTION

Accordingly, the present invention has been developed with a view to substantially eliminating the above described disadvantage and inconveniences inherent in the prior art knock control systems and has for its essential object to provide an improved version which can quickly respond to the occurrence of the engine knocking for suppressing the knocking by controlling the supercharged pressure to an optimum value with the ultimate purpose of substantially avoiding both the reduction in engine power output and the excessively increased exhaust temperature.

In order to accomplish the above described objects, and referring to FIG. 1 of the accompanying drawings which illustrates, in a circuit block diagram, a general construction of the control system, the present invention provides the control system which comprises a supercharger 2 for supercharging a suction air flowing towards the engine 1, an engine condition detecting means 3 for detecting an operating condition of the engine (represented by one or a combination of the engine speed, the engine temperature, the load on the engine and other parameters), and a knocking detector 4 for detecting the occurrence of the knocking, an ignition timing determining means 5, a supercharged pressure regulating means 6, an ignition timing correcting means 7, and a supercharged pressure correcting means 8. The timing determining means 5 is operable to determine a principle ignition timing in response to an output from the engine condition detecting means 3, and the timing correcting means 7 is operable in response to an output from the knocking detector 4 to adjust the principle ignition timing in dependence on the occurrence of the engine knocking. The ignition timing can therefore be controlled by both the knocking detector 4 and the correcting means 7 through an igniting device 9.

On the other hand, the pressure regulating means 6 is operable to regulate the supercharged pressure to a predetermined target value, and the pressure correcting means 8 is operable to adjust the target supercharged pressure in reference to the angle through which the ignition timing has been corrected by the timing correcting means 7.

BRIEF DESCRIPTION OF THE DRAWINGS

This and other objects and features of the present invention will become readily understood from the following detailed description taken in conjunction with preferred embodiments thereof with reference to the accompanying drawings, in which.

DETAILED DESCRIPTION OF THE EMBODIMENTS

Figure 1:
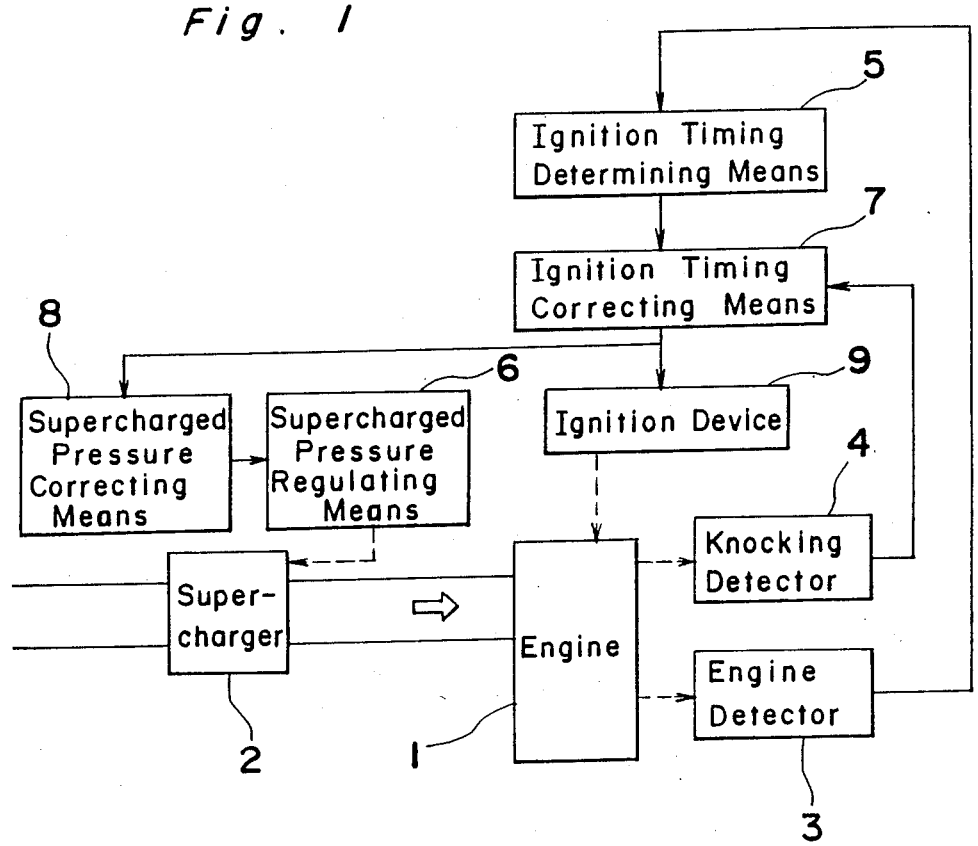
FIG. 1 is a schematic circuit block diagram showing the principle of the knock control system according to the present invention.
Figure 1A:
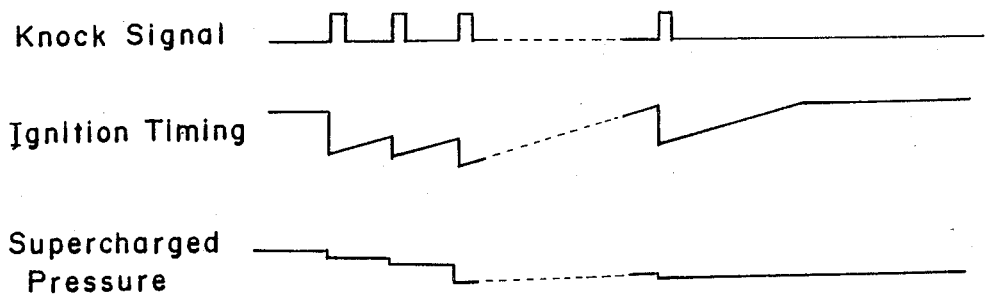
FIG. 1(a) is a diagram showing waveforms of some signals processed by the control system of the present invention.

Before the description of the present invention proceeds, it is to noted that like parts are designated by like reference numerals throughout the accompanying drawings.

Figure 2:
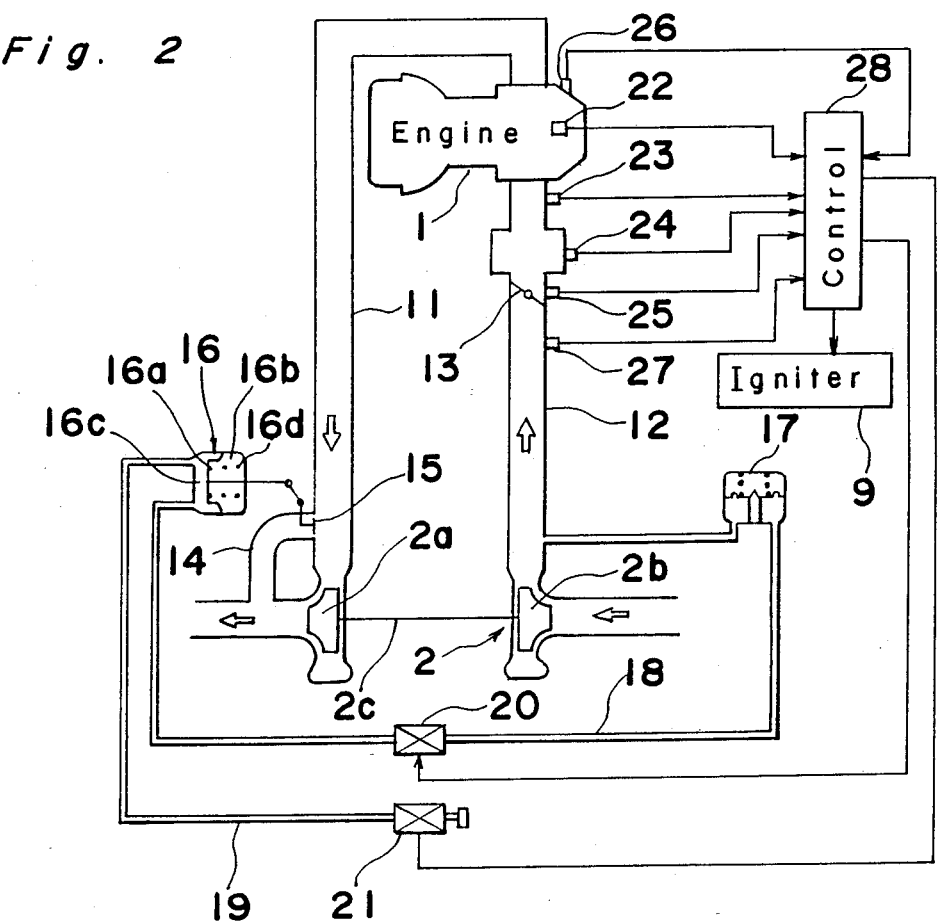
FIG. 2 is a schematic skeletal diagram showing the control system according to a preferred embodiment of the present invention.

Referring first to FIG. 2, there is shown an automobile engine 1 having a suction passage 12 and an exhaust passage 11. A supercharger 2 which is a turbocharger so far shown includes a turbine 2a, installed on the exhaust passage 11 and adapted to be driven by the flow of exhaust gases therethrough, and a compressor 2b installed on the suction passage 12 and drivingly coupled with the turbine 2a through a connecting shaft 2c. The compressor 2b when driven by the turbine 2a compresses air being sucked through the suction passage 12 towards the engine 1 thereby to supply a supercharged air to the engine 1 at a supercharged pressure greater than that developed by the suction of the piston or pistons alone. The suction passage 12 has a throttle valve 13 disposed therein downstream of the supercharger compressor 2b with respect to the direction of flow of the air towards the engine.

The exhaust passage 11 has a bypass passage 14, bypassing the supercharger turbine 2a, and a waste gate 15 disposed at an upstream end of the bypass passage 14. The waste gate 15 can be actuated by a pressure responsive actuator 16 in such a way that, when the water gate 15 is closed, it can direct the entire flow of exhaust gases through the turbine 2a, but when the same gate 15 is opened, it can allow the exhaust gases to bypass the turbine 2a at a rate dependent on the opening of the waste gate 15. More specifically, the bypass passage 14 in combination with the waste gate 15 is provided for controlling the supercharged pressure in such a manner as to reduce the supercharged pressure with increase in opening of the waste gate 15, but as to increase the supercharged pressure with decrease in opening of the waste gate 15. This is possible because as the waste gate 15 is opened, a relatively great quantity of the exhaust gases is allowed to bypass the turbine 2a causing the latter to provide a reduced drive to the compressor 2b, but as the waste gate 15 is closed, it is allowed to flow through the turbine 2a to provide a relatively increased drive to the compressor 2b.

The actuator 16 comprises a casing having a diaphragm 16a operatively coupled with the waste gate 15 and dividing the interior of the casing into a pressure chamber 16c and an atmospheric chamber 16b. The atmospheric chamber 16b is in communication with the atmosphere and contains a biasing spring 16d urging the waste gate 15 to a closed position. The pressure chamber 16c has first and second passages 18 and 19 communicated thereto, the first passage 18 extending so as to communicate with a portion of the suction passage 12 between the compressor 2b and the throttle valve 13 through a first electromagnetic valve 20 and then through a pressure regulator 17 whereas the second passage 19 extends so as to communicate with the atmosphere through a second electromagnetic valve 21. The first and second passages 18 and 19 are for the introduction of a positive pressure, regulated by the regulator 17 to a predetermined value, into the pressure chamber 16c and for the ventilaton from the pressure chamber 16c to the atmosphere, respectively. The first electromagnetic valve 20 when energized permits the introduction of the positive pressure into the pressure chamber 16c, the ratio of increase of the pressure inside the chamber 16c being dependent on the time during which the first electromagnetic valve 20 is energized, whereas the second electromagnetic valve 21 when energized permits the ventilation of air inside the pressure chamber 16c to the atmosphere, the rate of consequent decrease of the pressure inside the chamber 16c being dependent on the time during which the second electromagnetic valve 21 is energized. Thus, it will readily be understood that the opening of the waste gate 15 varies with the pressure inside the pressure chamber 16c of the actuator 16 and, hence, the supercharged pressure inside the suction passage 12 downstream of the compressor 2b can be controlled by the pressure inside the pressure chamber 16c.

The system also comprises an engine condition detecting means for detecting the operating condition of the engine 1, which detecting means is constituted by, so far shown, an engine speed sensor 22 for detecting, and generating a signal indicative of, the engine speed, a water temperature sensor 23 for detecting, and generating a signal indicative of, the temperature of a cooling water for cooling the engine, a suction temperature sensor 24 for detecting, and generating a signal indicative of, the temperature of air being sucked towards the engine, and a throttle 25 for detecting, and generating a signal indicative of, the opening of the throttle valve 13. The system further comprises a knock sensor 26 for detecting, and generating a signal indicative of, the occurrence of engine knocking in terms of vibration induced in the engine, and a pressure sensor 27 for detecting, and generating a signal indicative of, the supercharged pressure inside the suction passage 12. All of the signals generated from the sensors 22 to 27 are supplied to a computerized control unit 28 utilizing a microcomputer.

The control unit 28 is so designed and so operable as to determine the ignition timing appropriate to a particular operating condition of the engine and as to correct the ignition timing in dependence on the occurrence of the engine knocking before a firing signal is outputed to an igniter 9, thereby constituting both an ignition timing determining means and an ignition timing correcting means. Moreover, the control unit 28 is so designed and so operable as to set the supercharged pressure to a target value appropriate to a particular operating condition of the engine, as to correct the target supercharged pressure in dependence on the angle through which the ignition timing has been corrected, and as to output a control pulse to either of the first and second electromagnetic valves 20 and 21 for controlling the supercharged pressure on the basis of the result of comparison of the actual supercharged pressure with the final target value so determined, thereby constituting a supercharged pressure regulating means and a supercharged pressure correcting means.

Figure 3:
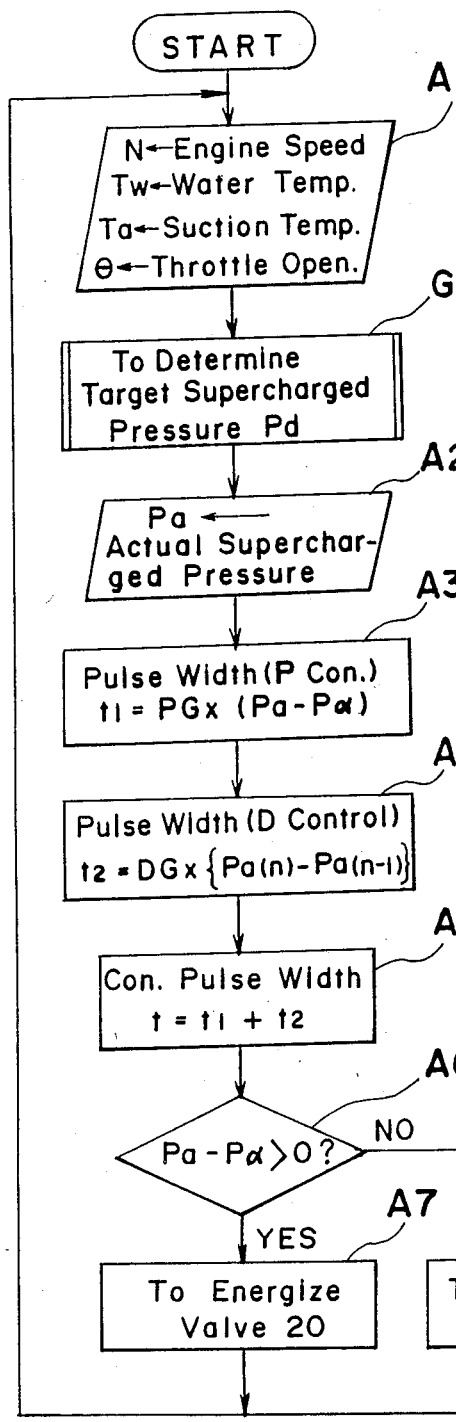
FIG. 3 is a chart showing a program flow for the control of the supercharged pressure used in the system of FIG. 2.
Figure 4:
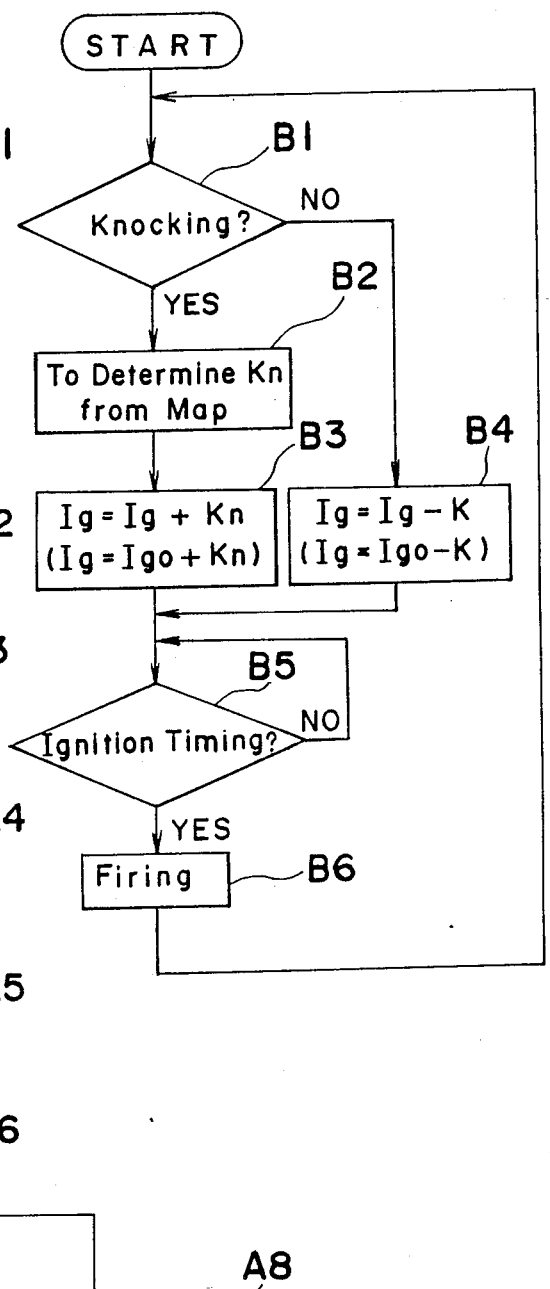
FIG. 4 is a chart showing a program flow for the control of the ignition timing used in the system.
Figure 5:
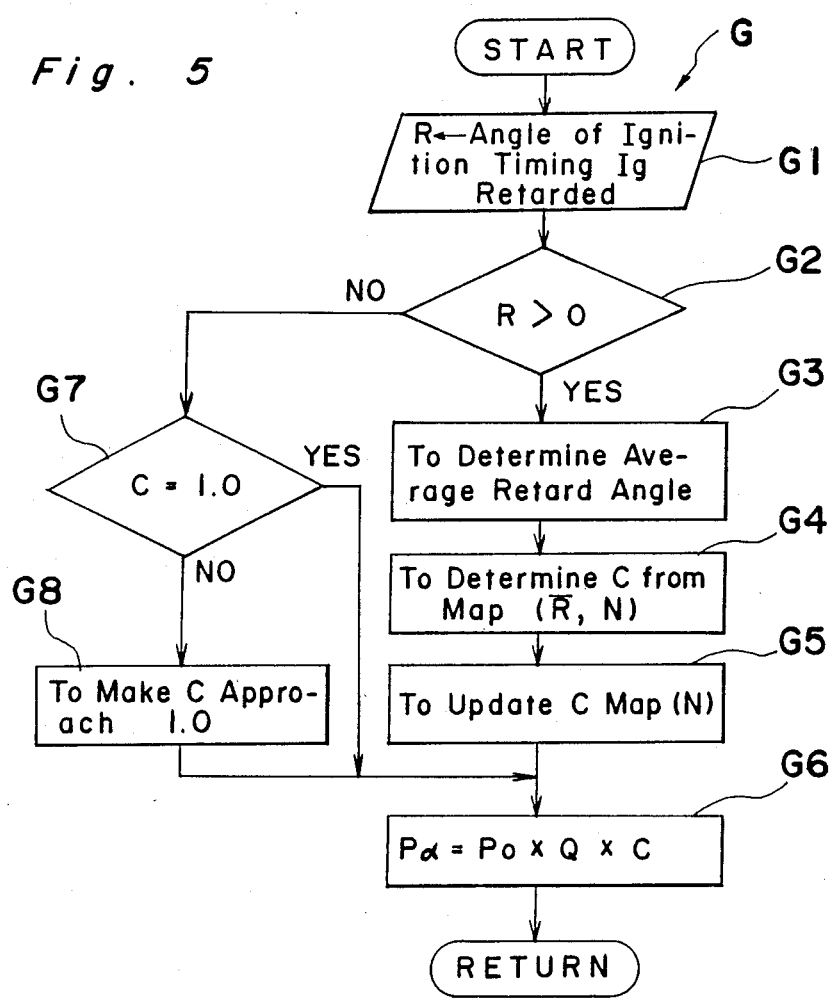
FIG. 5 is a chart showing the program flow of a subroutine executed in the program flow of FIG. 3.

The control unit 26 performs its operation according to the control program shown in the flow charts of FIGS. 3 to 5.

Referring first to FIG. 3 showing the program used to control the supercharged pressure, all of the engine speed N, water temperature Tw, suction temperature Ta and throttle opening $\theta$, derived respectively by the signals from the sensors 22 to 25, are stored in a register at step A1. Subsequently, a subroutine G for the calculation of the target supercharged pressure Pd is executed to determine the target supercharged pressure Pd as will be described later, followed by the storage in a register of the actual supercharged pressure Pa actually detected by the pressure sensor 27 at step A2. Then at step A3, the difference between the actual supercharged pressure Pa and the target supercharged pressure Pd is multiplied by a constant PG to give a proportional control pulse width $t_1$, followed by step A4 at which the difference between the actual supercharged pressure Pa(n) currently detected and the actual supercharged pressure Pa(n−1) previously detected during the previous execution of the main flow of FIG. 3 is multiplied by a constant DG to give a differential control pulse width $t_2$. The pulse widths $t_1$ and $t_2$ are then summed together to give a pulse width t of a control pulse to be applied to either of the first and second electromagnetic valves 20 and 21, followed by a decision step A6. The program flow from step A3 to step A5 is such as to determine the pulse width t determinative of the amount of control of the supercharged pressure in such a manner that, unless the actual supercharged pressure Pa sufficiently approaches the target supercharged pressure Pd, the amount of control of the supercharged pressure becomes small, but when the actual supercharged pressure Pa approaches the target supercharged pressure Pd, the amount of control of the supercharged pressure becomes great.

At the decision step A6, a decision is made to determine if the actual supercharged pressure Pa is higher than the target supercharged pressure Pd. If the result of the decision indicates "YES", the control of the pulse width t is applied to the first electromagnetic valve 20 to energize the latter for a duration equal to the pulse width t at step A7, but if the result of the decision indicates "NO", the control pulse of the width t is applied to the second electromagnetic valve 21 to energize the latter for a duration equal to the pulse width t at step A8, with the program flow returning to the initial step A1 for the repetition thereof. Thus, it will be readily seen that, when the actual supercharged pressure Pa is higher than the target value Pd, the waste gate 15 is opened to eventually reduce the supercharged pressure down to the target value Pd, but when the actual supercharged pressure Pa is not higher than the target value Pd, the waste gate 15 is closed to eventually increase the supercharged pressure to the target value Pd.

The ignition timing is controlled by the control unit 28 according to the program flow shown in FIG. 4. As shown, the program flow starts from a decision step B1 at which a decision is made to determine on the basis of the signal from the knock sensor 26 if the engine knocking has occurred. If the result of the decision indicates "YES", a knocking correction factor Kn for the ignition timing is determined at step B2 from a map mapped in relation to the engine speed and is then added at step B3 to the ignition timing Ig, but if the result of the decision indicates "NO", the ignition timing Ig is subtracted by a relatively small constant K at step B4. In other words, in the event of occurrence of the engine knocking, the ignition timing Ig is retarded an angle corresponding to the knocking correction factor Kn, but in the even that the engine knocking once having occurred ceases, the ignition timing Ig then retarded is gradually returned to the proper timing. In this calculation of the ignition timing, a principle ignition timing appropriate to a particular engine operating condition is established beforehand as an initial timing for the ignition timing Ig. After the ignition timing has been calculated in this way, a decision is made at step B5 to determine if the ignition timing has come, and only wnen the result of the decision at step B5 indicates "YES", the spark plug firing takes place at step B6. The program flow is thereafter repeated for the subsequent ignition timing control.

Referring now to FIG. 5 showing the subroutine G for the determination of the target supercharged pressure, the angle R through which the ignition timing Ig is retarded is inputed and stored in a register at step G1. At the subsequent step G2, a decision is made to determine if the retard angle R is greater than 0. If the retard angle R is greater than 0, an average value $\overline{R}$ of the retard angles with respect to appropriate firing pulses retarded is calculated at step G3, followed by the determination, at step G4, of a supercharged pressure correction factor C appropriate to the average retard angle $\overline{R}$ and the engine speed N then prevailing, from a first map storing the supercharged pressure correcting factor C for each combination of average retard angle $\overline{R}$ and engine speed N. At step G5, a second map which is rewriteable and which stores the supercharged pressure correction factor C in relation to the particular engine speed N is updated. This supercharged pressure correction factor is smaller than 1, and the greater any one of the average retard angle $\overline{R}$ and the engine speed, the smaller the correction factor C. After the determination of the correction factor C, the target supercharged pressure is calculated at step G6.

On the other hand, if the result of the decision at step G2 indicates that the retard angle is greater than 0, another decision step G7 takes place to determine if it is equal to 1. If it proves to be equal to 1, the calculation of the target supercharged pressure Pd takes place at step G6, but if it proves not to be equal to 1, the calculation of the target supercharged pressure Pd at step G6 takes place after the correction factor C has been modified to gradually approach 1 at step G8.

Figure 6:
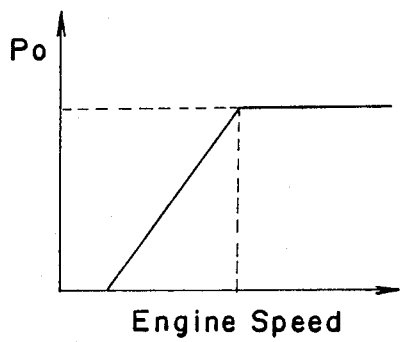
FIG. 6 is a graph showing the relationship between the principle supercharged pressure and the engine speed.
Figure 7:
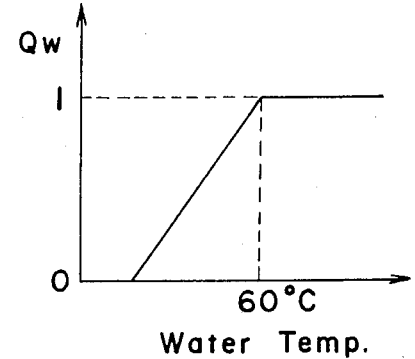
FIG. 7 is a graph showing the relationship between a correction factor and the water temperature.
Figure 8:
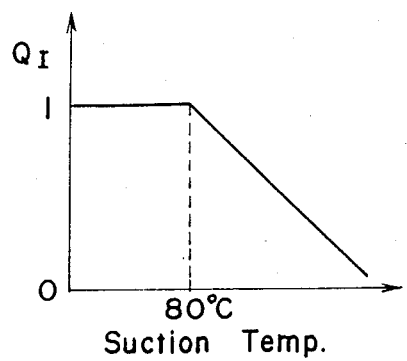
FIG. 8 is a graph showing the relationship between the correction factor and the suction temperature.
Figure 9:
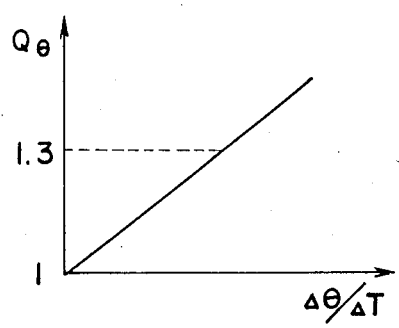
FIG. 9 is a graph showing the ratio of the correction factor relative to change in throttle opening.

At step G6, the target supercharged pressure Pd is calculated by the following equation:

$$Pd = Po \times Q \times C$$

wherein Po represents the principle supercharged pressure determined in dependence on the engine speed as shown in FIG. 6, Q represents a correction coefficient determined in dependence on the water temperature, the suction temperature and the throttle opening, that is, $Q = Q_W \times Q_I \times Q_\theta$ as shown in FIGS. 7 to 9, and C represents the supercharged pressure correction factor. After the determination of the target supercharged pressure Pd, the subroutine completes and the main program flow of FIG. 3 is resumed.

As hereinbefore described, when the engine knocking has taken place, the ignition timing Ig is retarded an angle corresponding to the predetermined knocking correction factor Kn, and when the engine knocking subsequently diminishes, the ignition timing Ig once retarded is returned to the original timing. On the other hand, the target supercharged pressure Pd is corrected a quantity corresponding to the supercharged pressure correction factor C dependent on the average retarded angle $\overline{R}$ of the ignition timings to decrease so that the actual supercharged pressure Pa can gradually approach the supercharged pressure Pd. Accordingly, not only can the knocking be quickly relieved by the correction of the ignition timing, but also the reduction of the supercharged pressure incident to the correction of the ignition timing renders the engine system less susceptible to knocking, the reduced supercharged pressure in turn providing the basis for the subsequent control of the ignition timing with the average retard angle of the ignition timings consequently becoming small.

Figure 10A:
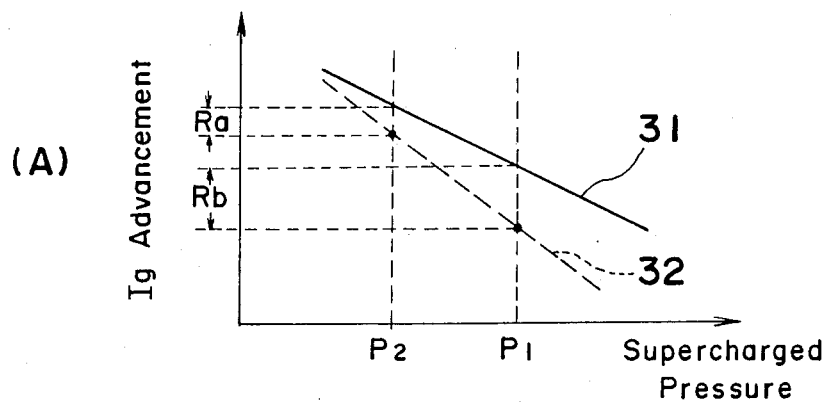
FIG. 10(a) is a graph showing the relationship between the ignition timing and the supercharged pressure.
Figure 10B:
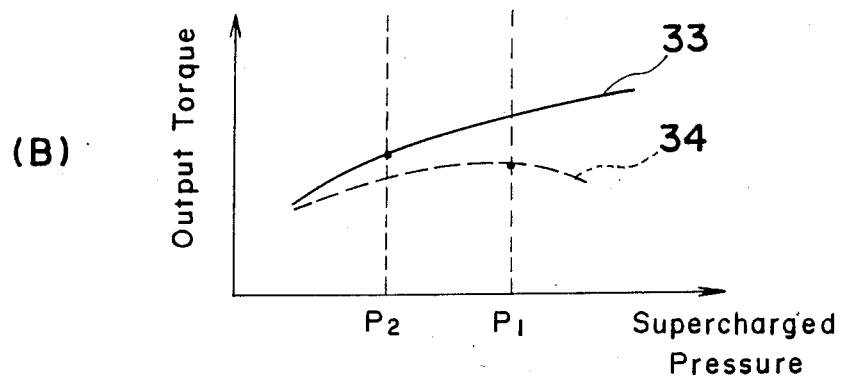
FIG. 10(b) is a graph showing the relationship between the engine output torque and the supercharged pressure.

When the ignition timing and the engine output torque are compared in the case of the simultaneous control of both the ignition timing and the supercharged pressure according to the present invention and in the case of the conventional control in which only the ignition timing is controlled, respective graphs shown in FIGS. 10(a) and 10(b) can be obtained. In FIG. 10(a), the solid line 31 represents the preset ignition timing (optimum ignition timing) appropriate to the particular engine operating condition such as engine speed, the broken line 32 represents the ignition timing delimited to avoid any possible occurrence of the engine knocking, character $P_1$ represents the preset supercharged pressure in the case where no correction is effected to the supercharged pressure in dependence on the retard angle of the ignition timing, and character $P_2$ represents the supercharged pressure corrected in dependence on the retard angle of the ignition timing. As can be understood from the graph of FIG. 10(a), the higher the supercharged pressure, the more susceptible the engine knocking, and accordingly, the ignition timing delimited to avoid the occurrence of the engine knocking is greatly retarded. Therefore, the retard angle (average value) Ra of the ignition timing where both the ignition timing and the supercharged pressure are corrected by the control described hereinbefore is smaller than the retard angle Rb of the ignition timing where only the ignition timing is controlled.

With respect to the relationship between the supercharged pressure and the engine output torque, it follows the solid-lined curve 33 and the broken-lined curve 34, shown in FIG. 10(b), where the retard angle of the ignition timing is small and where it is great, respectively. From the graph of FIG. 10(b), it will be readily understood that, when the retard angle is great, the engine efficiency is lowered, accompanied by a considerable reduction in engine output torque. In contrast thereto, where the retard angle is minimized by correcting the supercharged pressure, the reduction in engine efficiency can be suppressed with the consequence of the minimized possibility of the engine output torque being reduced.

Figure 11:
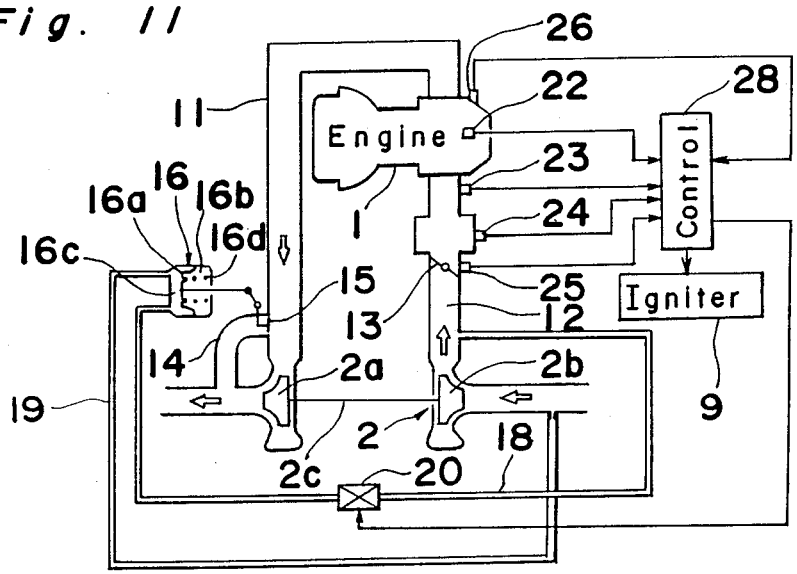
FIG. 11 is a diagram similar to FIG. 2, showing the embodiment of FIG. 12.
Figure 12:
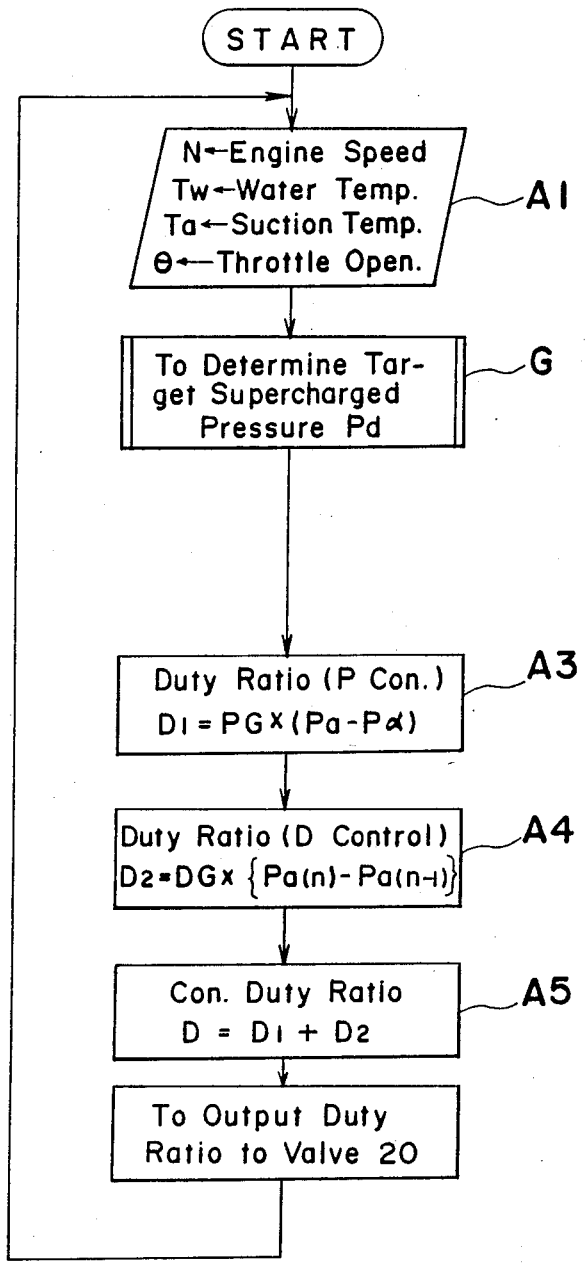
FIG. 12 is a chart similar to FIG. 3, but associated with another preferred embodiment of the present invention.

In the embodiment shown in FIG. 11, while the control system shown therein is substantially similar to, and operates in a manner similar to, that according to the foregoing embodiment, the supply of the pressure to the pressure chamber 16c of the actuator 16 is controlled by a duty solenoid on the one hand, and the second passage 19 is communicated direct with the suction passage 12 upstream of the supercharger compressor. The main program flow for the sequential control of operation of the system of FIG. 11 is shown in FIG. 12 wherein, instead of the pulse width t, the duty ratio D is employed.

Although the present invention has been fully described in connection with the preferred embodiments with reference to the accompanying drawings, it is to be noted that various changes and modifications are apparent to those skilled in the art. By way of example, the control of the supercharged pressure may also be carried out by relieving a portion of the suction air, having been compressed by the supercharger compressor, through an electromagnetically controlled valve. Also, the supercharger which has been described and shown as employed in the form of the turbocharger, may be employed in the form of an engine driven air pump, or any other similar compressor.

Accordingly, unless they depart from the scope of the present invention as defined by the appended claims, such changes and modifications are to be understood as included therein.

What is claimed is:

1. A knock control system for a supercharged internal combustion engine, comprising:

a supercharger for supercharging a suction air being supplied to the engine;

engine condition detecting means for detecting an operating condition of the engine;

knock detecting means for detecting the occurrence of knocking in the engine;

ignition timing determining means operable in response to an output signal from the engine condition detecting means for determining an ignition timing;

pressure regulating means for regulating to a target value the pressure of the suction air which has been supercharged;

ignition timing correcting means operable in response to an output signal from the knock detecting means for retarding the ignition timing upon the detection of occurrence of the knocking; and supercharged pressure correcting means for lowering the target supercharged pressure in dependence upon both a current retard angle at which said ignition timing correcting means is retarding the ignition timing and a preceding retard angle at which said ignition timing correcting means had previously retarded the ignition timing such that the greater that the current or the preceding retard angle is, the more the supercharged pressure correcting means lowers the target supercharged pressure.

2. The system as claimed in claim 1, wherein the supercharger includes a turbocharger having a turbine driven by exhaust gases emitted by the engine.

3. The system as claimed in claim 2, wherein the regulating means includes a waste gate assembly, said waste gate assembly comprising a valve disposed in a bypass passage bypassing the turbine and a diaphragm device adapted to be actuated by a portion of the suction air for selectively closing and opening the valve.

4. The system as claimed in claim 1, wherein said supercharged pressure correcting means gradually increases the target supercharged pressure when the current retard angle is zero.

5. The system as claimed in claim 1, wherein the supercharged pressure correcting means determines a correction factor for the target supercharged pressure, in dependence on an average value of a plurality of retard angles of the ignition timings.

6. The system as claimed in claim 1, wherein the supercharged pressure correcting means determines a correction factor in dependence on the retard angle and engine speed, and wherein the higher one of the engine speed or the greater the retard angle, the greater the amount of the supercharged pressure is reduced.

7. The system as claimed in claim 1, wherein the pressure regulating means includes a feedback control for regulating the supercharged pressure in dependence on the result of comparison of an actual supercharged pressure with the target supercharged value.

8. A knock control system for a supercharged internal combustion engine , comprising:

a supercharger for supercharging a suction air being supplied to the engine;

engine condition detecting means for detecting an operating condition of the engine;

knock detecting means for detecting the occurrence of knocking in the engine;

ignition timing determining means operable in response to an output signal from the engine condition detecting means for determining an ignition timing;

pressure regulating means for regulating to a target value the pressure of the suction air which has been supercharged;

ignition timing correcting means operable in response to an output signal from the knock detecting means for retarding the ignition timing upon the detection of occurrence of the knocking; and target supercharged pressure determining means for adjusting the supercharged pressure of the suction air to a target value determined by a predetermined principle term, a first correction term dependent upon engine conditions including temperature of the suction air and temperature of an engine cooling water, and a second correction term dependent on both a current retard angle at which said ignition timing correcting means is retarding the ignition timing and a preceding retard angle at which said ignition timing correcting means had previously retarded the ignition timing such that the greater that the current or the preceding retard angle is, the more said second correction term lowers the target supercharged pressure.

9. The system as claimed in claim 8, wherein the principle term is dependent on an engine speed.

10. The system as claimed in claim 8, wherein the second term is dependent on both the current and preceding retard angles and an engine speed.

11. The system as claimed in claim 5, wherein said supercharged pressure correcting means lowers the target supercharged pressure and said ignition timing correcting means retards the ignition timing concurrently.

12. The system as claimed in claim 8, wherein said target supercharged pressure determining means adjusts the target supercharged pressure and said ignition timing correcting means retards the ignition timing concurrently.

* * * * *